(12) United States Patent
Lopez

(10) Patent No.: US 6,443,200 B1
(45) Date of Patent: Sep. 3, 2002

(54) TREAD INCLUDING RELIEF ELEMENTS HAVING UNDERCUT LATERAL WALLS AND INCISION THAT DOES NOT CUT INTO RIDGE

(75) Inventor: José Merino Lopez, Riom (FR)

(73) Assignee: Michelin Recherche et Technique S.A. (CH)

( * ) Notice: Subject to any disclaimer, the term of this patent is extended or adjusted under 35 U.S.C. 154(b) by 0 days.

(21) Appl. No.: 09/522,644

(22) Filed: Mar. 10, 2000

(30) Foreign Application Priority Data

Mar. 10, 1999 (FR) .............................. 99 03051

(51) Int. Cl.[7] .................. B60C 11/04; B60C 11/12; B60C 11/117; B60C 109/00
(52) U.S. Cl. .................. 152/209.17; 152/209.21; 152/901; 152/DIG. 3
(58) Field of Search ................ 152/209.17, 209.18, 152/209.21, 901, DIG. 3

(56) References Cited

U.S. PATENT DOCUMENTS

| | | | | |
|---|---|---|---|---|
| 1,733,064 A | | 10/1929 | Lambert | |
| 2,121,955 A | * | 6/1938 | Eger | 152/DIG. 3 |
| 2,261,025 A | * | 10/1941 | Havens | 152/DIG. 3 |
| 2,264,767 A | | 12/1941 | Ofensend | |
| 2,327,057 A | * | 8/1943 | Ofensend | 152/209.21 |
| 2,575,439 A | | 11/1951 | Billingsley | |
| 3,332,465 A | * | 7/1967 | French | 152/DIG. 3 |
| 3,532,147 A | * | 10/1970 | Gough | 152/209.17 |
| 3,770,040 A | * | 11/1973 | De Cicco | 152/209.21 |
| 4,979,549 A | * | 12/1990 | Kaneko | 152/209.17 |
| 5,022,448 A | | 6/1991 | Ochiai | |
| 5,109,901 A | * | 5/1992 | Miyamoto et al. | 152/DIG. 3 |

FOREIGN PATENT DOCUMENTS

| | | | | |
|---|---|---|---|---|
| EP | 0858875 | | 8/1998 | |
| EP | 1033267 | * | 9/2000 | 152/209.17 |
| FR | 2759323 | | 8/1998 | |
| GB | 480624 | * | 2/1938 | 152/209.18 |
| GB | 507254 | * | 6/1939 | 152/209.17 |
| JP | 3-153401 | * | 7/1991 | 152/209.17 |
| JP | 5-338412 | * | 12/1993 | 152/209.71 |

OTHER PUBLICATIONS

Abstract for Europe 858875.*
Abstract for French 2759323.*

* cited by examiner

*Primary Examiner*—Steven D. Maki
(74) *Attorney, Agent, or Firm*—Baker Botts LLP

(57) ABSTRACT

A tire pattern of a tread intended to be fitted on a tire and including a plurality of elements in relief intended to come into contact with the ground on which the tire fitted with such a tread travels. At least one element in relief having at least one lateral wall undercut relative to the running surface of the tread and provided with at least one incision which opens on to the surface wall of the element in relief and on to at least one undercut lateral wall. So as not to alter the rigidity of said element in relief, in a manner which may be disadvantageous for the performance of a tire fitted with this tread, provision is made that, for levels of wear of the tread between a first depth H1 and a second depth H2, each incision does not cut into the edges or ridges of said element in relief. Also, a mold equipped with molding elements for molding such a tread pattern.

7 Claims, 4 Drawing Sheets

TREAD INCLUDING RELIEF ELEMENTS HAVING UNDERCUT LATERAL WALLS AND INCISION THAT DOES NOT CUT INTO RIDGE

BACKGROUND OF THE INVENTION

The invention relates to a tread pattern for a tread intended for a tire for heavy vehicles; it also relates to a mold making it possible to obtain such a tread pattern by molding.

In order to maintain, or even improve, the performance of a tread pattern of a tire comprising elements in relief under conditions of travel on slippery ground (such as, for example, ground covered with water), it is known to make on said elements a plurality of cutouts in the form of grooves and/or incisions (an incision having a width less than the width of a groove, and generally the width of an incision is less than 3 mm). These cutouts in total cross the width of the rib to interconnect the grooves defining said ribs.

It is also known that the performance on slippery ground is improved when the number of cutouts is large; however, an excessively large number of cutouts results in a great loss of rigidity of the elements in relief, which results in a general loss of performance, even on non-slippery ground. In fact, this loss of rigidity causes movements of greater amplitude for the points of the tread pattern which are in contact with the ground, which causes, among other disadvantages, so-called irregular wear in that they are localized (in particular on the ridges of the ribs) and no longer uniformly distributed over the entire running surface of the tread. This irregular wear significantly reduces the useful life of the tire provided with said tread pattern.

It is also known that the distributions of contact pressure between each element in relief of a tread pattern and the ground have a direct influence on the regularity of wear of said tread. For example, in the case of a tread pattern provided with a plurality of ribs defined by grooves of substantially longitudinal orientation (corresponding to the circumferential direction on the tire), it is known to mold grooves which, when viewed in cross-section, have widths which increase as the tread becomes worn.

By definition, the walls of the elements in relief defined by such grooves are said to be undercut relative to the running surface of the tread.

This arrangement makes it possible to make the ribs flexible in the vicinity of their ridges (defined as being the intersections of the lateral walls of each rib with its wall surface intended to come into contact with the ground) and thus to reduce the contact pressures of each rib with the ground close to said ridges. This reduction in pressure is more particularly substantial when the tread is new, that is to say, when the thickness of the tread is at a maximum.

However, if said latter tread pattern is provided with a plurality of incisions to increase the performance of adhesion on slippery ground, then the combination of a low pressure in the vicinity of the ridges of the ribs with movements of great amplitude linked to the presence of said incisions results in very pronounced irregular wear of these ribs in the vicinity of their ridges.

One known method of avoiding this irregular use is to make a plurality of incisions opening solely on to the surface wall of the ribs without cutting into the lateral walls and the ridges of the ribs; however, this arrangement results in noise problems which are linked to air being trapped within said incisions when they pass into contact with the ground during travel.

SUMMARY OF THE INVENTION

One object of the invention is to propose a tread for a tire, the tread pattern of which comprises a plurality of elements in relief defined by at least two grooves, and at least two of the lateral walls of which are undercut, some of said elements in relief being provided with at least one incision opening on to the running surface of the tread when new, said tread not having the disadvantages which have been discussed above.

There is proposed a tread for a tire which is provided with a tread pattern comprising a plurality of elements in relief defined by grooves, each element in relief being provided with a surface wall forming part of the running surface and intended to come into contact with the ground during travel, and at least two lateral walls which are undercut relative to the surface wall, the intersection of each of the lateral walls with the surface wall forming a ridge.

The tread according to the invention is characterized in that:

at least one element in relief is provided with at least one incision opening on to the surface wall thereof and on to at least one of its lateral walls, and in that the incision(s) do(es) not cut into the ridge common to said surface wall and to said lateral wall at least between a first depth H1 and a second depth H2, H2 being greater than Hi, these depths H1 and H2 being measured perpendicular to the surface wall of the element and corresponding to different levels of wear of the tread.

At least two of the lateral walls of one and the same element in relief are undercut, that is to say that they are inclined such that the width of the surface wall of said element decreases as the tread becomes worn.

The tread pattern according to the invention makes it possible to improve the performance of the tread pattern on ground which has been made slippery, owing to a number of incisions which may be large, without creating a problem of noise or of irregular wear on dry ground. Each element in relief of the tread pattern according to the invention may comprise a plurality of incisions which open both onto the contact surface of the element with the ground and into at least one of the grooves defining the element in relief to permit the evacuation to at least one of said grooves of the fluids entering the incision during travel.

It should be noted that as a general rule the maximum depth of the incisions is virtually equal to the depth of the grooves defining the elements in relief to benefit from a large number of ridges during the entire period of use of the tread; however, it is of course possible to provide different depths.

Preferably, the depth H1 is low compared with the depth of the incision in question, so as to retain sufficient rigidity for the element in relief, in particular when said element is subjected to forces of contact with the ground which are directed parallel to the ground and in a direction perpendicular to the average orientation of the incision; "low" is understood to mean that H1 is at most equal to 10% of the deepest of the cutouts (grooves and incisions included).

Each incision has on the running surface a geometric trace having an average orientation defined as being the angle formed with the longitudinal direction of the tread by the straight-line segment joining the points of said trace which are farthest from each other.

The tread pattern according to the invention has the advantage of perceptibly reducing the travelling noise on dry ground created by the presence of incisions due to the fact that these incisions open into at least one groove and can thus evacuate the air which they contain as they pass into contact with the ground.

This tread pattern, despite the large number of incisions, has the advantage of modifying relatively little the distribution of the contact pressures of each element on the ground, in particular close to the ridges, while alleviating the reduction in rigidity during the first part of use of the tread (that is to say, up to about a level of wear corresponding to half the thickness of said tread).

A good compromise between the maintenance of sufficient rigidity for an element in relief and optimum evacuation of the fluids contained in the incisions of said element in relief towards the adjacent grooves is achieved once the depth H2 is between 40% and 90% of the depth of said incisions.

Preferably, the incisions which open both on to the surface wall and on to at least one lateral wall of an element in relief do not cut into any of the ridges of said element when new (in this case: H1=0); the object of this arrangement is not to reduce the rigidity of the tread in the vicinity of the surface wall when new.

One particularly advantageous variant consists in distributing over one and the same element in relief of the tread pattern a plurality of incisions opening on to the surface wall of the tread when new, such that these incisions open alternately on one and then on the other lateral wall of said element without, for example, cutting into the ridges of this element when new. Thus after partial wear of the element in relief, the incisions opening on to the surface wall of said element only cut into a single ridge of the element, which makes it possible to maintain a balance of rigidities of the element in relief between one side of the element in relief and the other, avoiding sudden weakening of said rigidities.

To produce a tread pattern comprising at least one element in relief provided with at least one cutout opening on to the surface wall and on to part of at least one lateral wall of this element, it is clear that existing tire molds are not suitable, the main difficulty lying in demolding the molding elements from the mold without causing breaking of the ridges of the elements in relief. "Demolding" is understood to mean the extraction of these molding elements from the material constituting the tread after molding and vulcanization.

One known possibility consists in using a filler material for molding each incision before removing said material after molding; however, the difficulty of working and the high cost of such a method from an industrial point of view should be noted.

One object of the invention is to produce a mold for molding a rubber tread provided with such a tread pattern directly during the molding and vulcanization phase of a tire without necessarily having to mold the tread in a mold which simultaneously molds the inner and outer faces of this tread. This embodiment then requires an assembly stage with a tire blank manufactured separately. This is of course particularly costly, and is not without problems of strength of the bond between a prevulcanized tread and a tire blank, whether or not prevulcanized.

The mold according to the invention comprises a plurality of mold parts each having their own direction of molding/demolding. Each mold part has a molding surface intended to mold part of the running surface of a tread. Furthermore, each mold part is provided with molding elements which project over its molding surface. First molding elements, which are intended to mold grooves defining elements in relief of the tread pattern, comprise lateral faces and end faces limiting said lateral faces; these lateral faces are intended to mold the main lateral walls of the elements in relief on the tread. Second molding elements are intended to mold cutouts in the elements in relief; these molding elements also comprise lateral faces and end faces limiting said lateral faces. The lateral faces mold the lateral walls of cutouts of average orientation different from the average orientation of the grooves molded by the first molding elements.

The mold according to the invention is characterized in that:
- at least one lateral face of a molding element and one end face of another molding element of the mold part cooperate so as to be in contact and to define, at least in part, an orifice extending between a depth H1 and a depth H2 (H2 being greater than H1) to allow the rubber to pass during the molding of a tread, said depths H1 and H2 being measured from and perpendicular to the molding surface of the mold part, and
- one of said molding elements in contact with the other molding element is mounted to be mobile relative to the mold part and to this other molding element in a direction close or identical to the direction of molding/demolding of the mold part, so that, during a first phase of the demolding which consists in moving the mold part in its demolding direction, the resultant forces exerted by the rubber molded in each orifice on the mobile molding element force said element to remain in the tread and thus no longer to be in contact with the other molding element so as to permit, in a second phase of the demolding, the extraction of the mobile molding element from the tread and thus to finish the demolding without breaking the rubber molded in each orifice.

The expression "to define, at least in part, an orifice" indicates that the orifice in question is entirely defined by walls of two molding elements (this configuration corresponds, for example, to the variant shown in FIG. 5), or that it is defined both by walls of two molding elements and the molding surface of the mold part provided with said molding elements (the latter configuration corresponds, for example, to the variant shown in FIGS. 3A, 3B, 3C).

A mold according to the invention offers the advantage of making it possible industrially to mold a tread pattern of a tread having a pattern at least one element in relief of which comprises two of its lateral walls undercut and is provided with at least one incision opening on to the surface wall and on to at least one of the lateral walls of said element at least between a first depth H1 and a second depth H2, H2 being strictly greater than H1.

Other possibilities and advantages of the tread pattern and of the mold according to the invention will be provided in the following drawings, the object of which is to illustrate variant embodiments in non-limitative manner.

DESCRIPTION OF PREFERRED EMBODIMENTS

Figure 1:
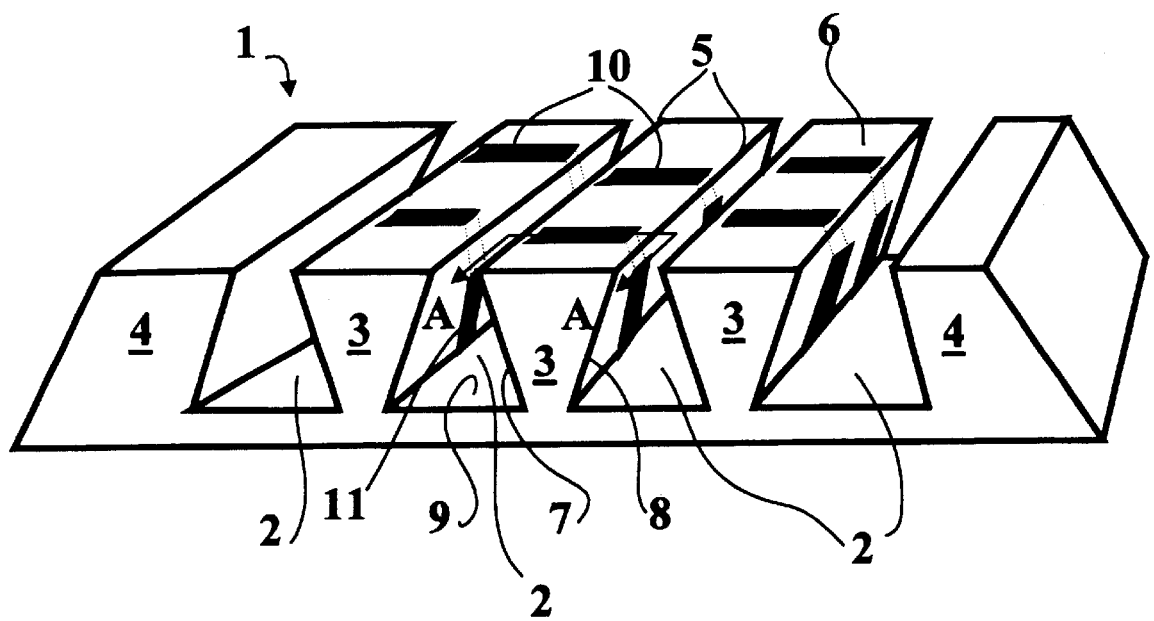
FIG. 1 shows part of a tread pattern of a tread according to the invention, comprising a plurality of ribs, the lateral walls of which are undercut.

In FIG. 1, there can be seen a portion of a tread 1 when new, intended to be fitted on a tire, said tread being provided with a tread pattern comprising three ribs 3 in the central part and a rib 4 on each of its two edges. Each of the three ribs 3 is defined by two grooves 2 of the same depth P and the widths of which over the running surface of the tread will increase with the wear of said tread.

Each rib 3 comprises a surface wall 6 intended to come into contact with the ground during travel and two lateral undercut walls 7 and 8; the intersections of the lateral walls 7 and 8 with the surface wall 6 form two ridges 5.

Furthermore, each rib 3 is provided with a plurality of incisions which open on to the surface wall 6 without cutting into the ridges 5 of this rib when new. The traces of these incisions 10 on the surface wall 6 are rectilinear and, in the variant described, are oriented transversely, that is to say perpendicularly to the longitudinal direction. Each incision 10 opens on to the lower parts of the two lateral walls of one and the same rib, as can be seen more easily in FIG. 2, which shows the section along AA of this tread pattern.

Figure 2:
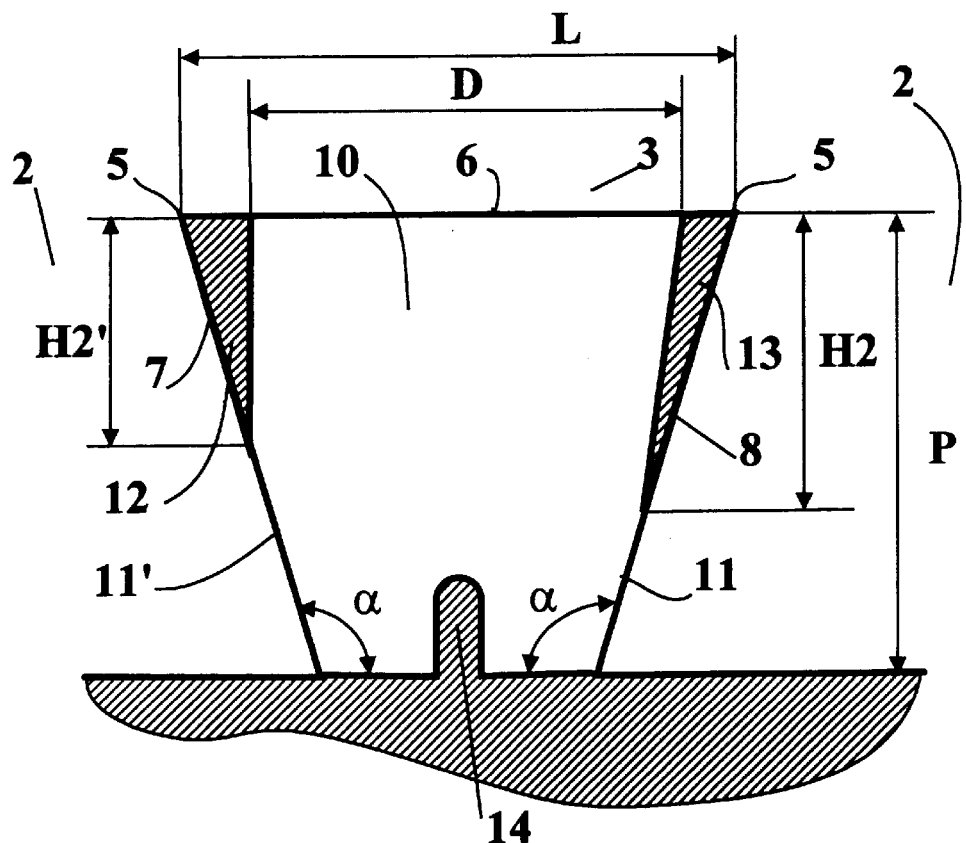
FIG. 2 shows a section AA along a plane perpendicular to the longitudinal direction of the tread of FIG. 1.

In this FIG. 2, there can be seen the traces of the lateral walls 7 and 8 of a rib 3 which are inclined relative to the bottom of the groove by an angle $\alpha$, $\alpha$ here being greater than 90° so as to be undercut close to the surface wall 6. The incision 10 opens on to the surface wall 6 over a width D less than the width L of the rib and along an average trace ("average trace" is understood to mean the straight line joining the end points of the incision on the surface wall). It opens on to the wall 7 by the part 11' from a depth H2' and as far as the bottom of the groove 2. The incision 10 also opens on to the walls 8 via the part 11 from a depth H2 as far as the bottom of the groove 2. In the variant illustrated, the depths H2 and H2' are different, but they could of course be identical.

The rubber wedges 12 and 13 located close to the ridges 5 of the rib which are visible in FIG. 2 are triangular in shape and extend between the running surface of the tread when new (which corresponds to H1 equal to zero) and H2 or H2'. Other geometric shapes may also be envisaged.

These rubber wedges maintain a sufficient level of rigidity of the rib when it is subjected to tangential forces in the longitudinal direction, for example when in contact with the ground. There can also be seen a rubber part 14 located close to the bottom of the incision and serving to limit the reduction in stiffness of the rib when it is half worn down.

All the incisions, in the present variant, are of substantially the same width D on the surface of the tread when new and the same depth as the depth P of the adjacent grooves.

Preferably, H2 and H2' are between 40% and 90% of the depth P of the grooves so as to limit effectively the reduction in stiffness due to the presence of the incisions when the tread is new, up to a certain level of wear of said tread.

Each incision according to the invention may, on the surface wall of an element in relief, have a varied shape, for example an undulating shape; likewise, if the shape of each incision in the thickness of the tread is considered, these incisions may have planar or curved or zigzag geometries.

The average orientation of this incision (that is to say, the angle formed by the straight-line segment joining the farthest points of the incision with the longitudinal direction of the tread) on the running surface of the tread when new may form any angle with the longitudinal direction of said tread; preferably, this angle is at least equal to 40°.

Figure 3A:
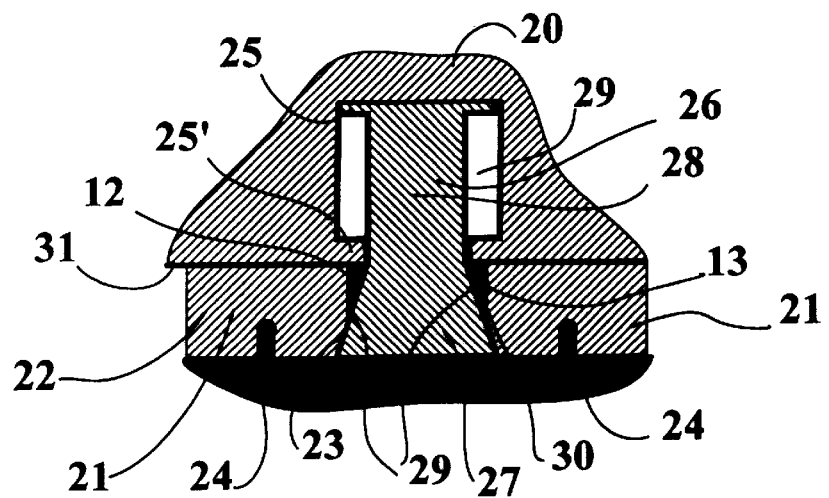
FIGS. 3A, 3B and 3C show sections through a mold for molding the tread pattern illustrated in FIG. 1.
Figures 3B, 3C:
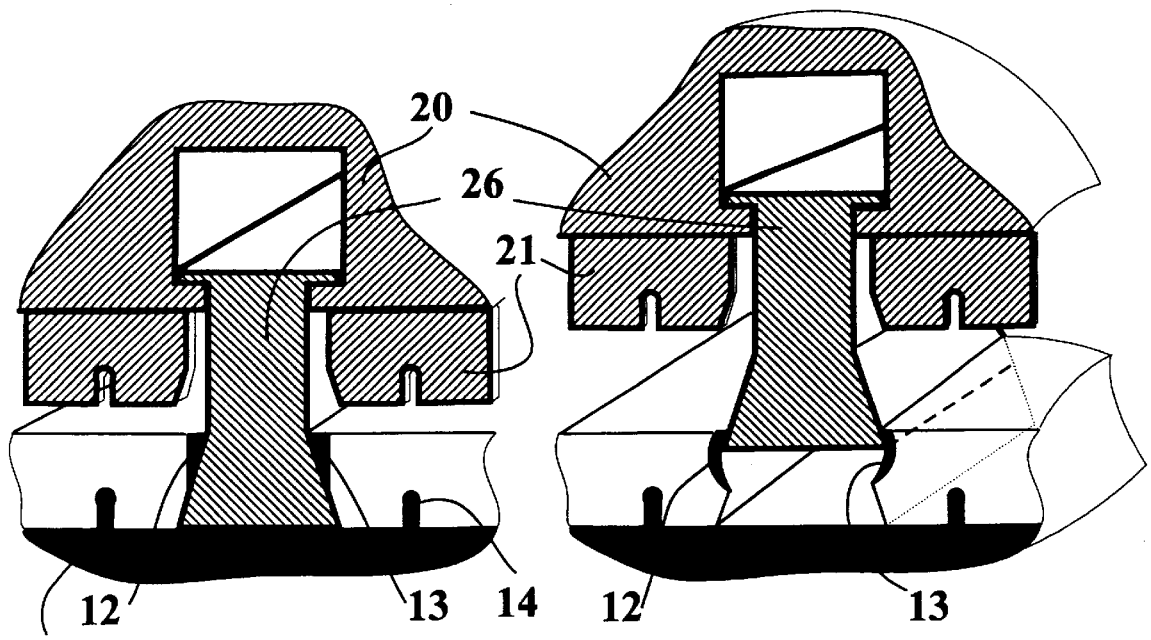

To produce the tread pattern which has just been presented on a flat tread, a mold is used, only part of which is shown diagrammatically in FIGS. 3A to 3C.

In FIG. 3A, there can be seen, in transverse section, only part of a mold 20 on which are fixedly mounted first molding elements in the shape of thin planar blades 21 for molding the incisions 10. These blades 21 comprise planar lateral walls 22 for molding the main walls of the incisions 10, these lateral walls 22 being limited by end walls 23. A notch 24 is provided on the part of the end wall 22 farthest from the molding surface 25 of the mold 20 for molding the rubber parts 14 at the base of the incision. It should be noted that the demolding of these parts 14 does not present any particular difficulty.

The different blades 21 may be made, for example, of metal or of a material which imparts sufficient rigidity to said blades to permit penetration into the raw rubber of a tread at the moment of closure of the mold Furthermore, a second molding element is mounted on the mold for molding a groove 2 and is in the form of a rib 26. This rib 26 comprises a first molding part 27 projecting over the surface 31 of the mold and extending in the longitudinal direction (perpendicular to the plane of the drawing), and extended by a second part 28 intended to be mounted within a housing 29 provided in the mold 20. The function of the second part 28 is to connect the molding element 26 to the mold 20 so as to permit limited relative movement of this molding element relative to said mold in one direction which is perpendicular to the molding surface 31 of said mold (this direction corresponding substantially to the direction of molding/demolding).

Shoulders 25 are provided on the second part 28 of the rib 26 to cooperate with shoulders 25' provided on the mold part 20 so as to restrict the movement of this second part 28 within the housing 29.

The molding part 27 of the molding element 26 comprises two lateral walls 29 intended for molding the undercut lateral walls of the ribs 3 of the tread.

In the molding configuration shown in FIG. 3A, part of the end wall 23 of a blade 21 is in contact with a lateral wall 29 of the molding element 26 and cooperates with said element and the surface 31 of the mold to define an orifice 30 serving as a passage for the rubber during the molding of a tread.

After molding and vulcanization of a tread with this mold, the tread is demolded, that is to say, the molding elements 21 and 26 are extracted from the tread; this demolding operation is illustrated diagrammatically in the two FIGS. 3B and 3C.

Before this operation is described, it may be noted that if the first and second molding elements were all integral with the mold, it would obviously be impossible to demold the tread without breaking the rubber parts 12 and 13 molded in the orifices 30.

FIG. 3B shows the first part of the demolding during which the mold 20 is moved in its demolding direction, that is to say, in a direction substantially perpendicular to the thickness of the tread; during this movement, the blades 21, which are integral with the mold 20, are extracted from the rubber.

During this first demolding phase, the rubber parts 12 and 13 molded in the orifices 30 exert on the lateral walls 29 of the molding element 26 forces which oppose the extraction of said molding element from the tread. Under the action of these forces, and taking into account the mobile mounting of this molding element 26 within the housing 29, the molding elements 26 move relative to the blades 21, thus creating a passage for demolding the rubber parts 12, 13 molded in the orifices 30.

Continuing the translational movement of the mold 20 in the same direction, the shoulders 25 provided on the molding element 26 butt against the shoulders 25' provided on the surface of the mold and the molding element 26 is then entrained by the mold in its movement. In this latter movement, shown in FIG. 3C, the lateral walls of the molding element 26 exert forces on the rubber parts 12 and 13 which, taking into account the elastic, deformable nature of the rubber material forming the tread, deform sufficiently to permit the total extraction of the molding element 26 from the tread without cutting out said rubber parts 12, 13.

The mold which has just been described for molding a flat tread may readily be adapted to mold a tread in the form of a ring or alternatively directly on a tire during the molding of the latter.

Figure 5:
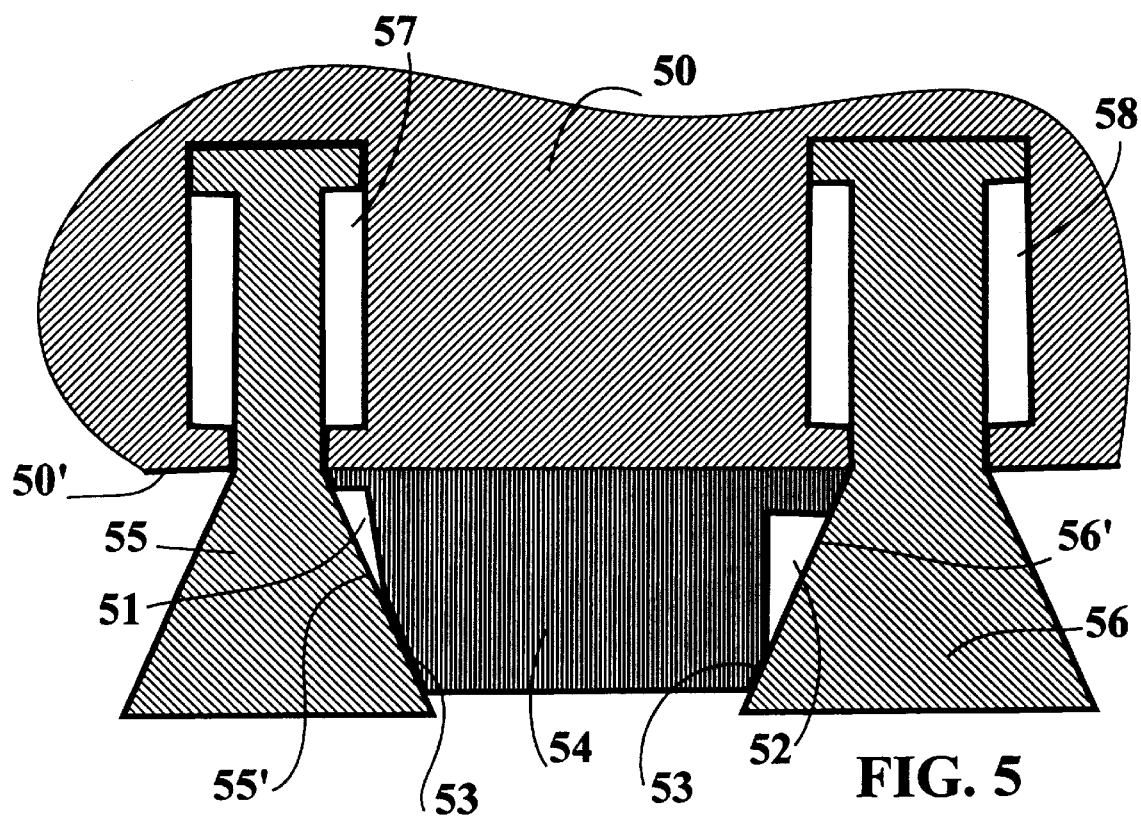
FIG. 5 shows another variant of a mold according to the invention for molding the incision of FIG. 4.

FIG. 5 shows another variant of a mold 50 according to the invention, in which two orifices 51, 52 are defined completely by an end wall 53 of a blade 54 and by the lateral walls 55' and 56' of two ribs 55 and 56. Whereas the blade 54 is mounted fixedly in the mold 50, the two ribs 55 and 56 are mounted to be mobile in housings 57, 58 provided in the mold, and means are provided to restrict the path of these ribs at the moment of demolding.

Figure 4:
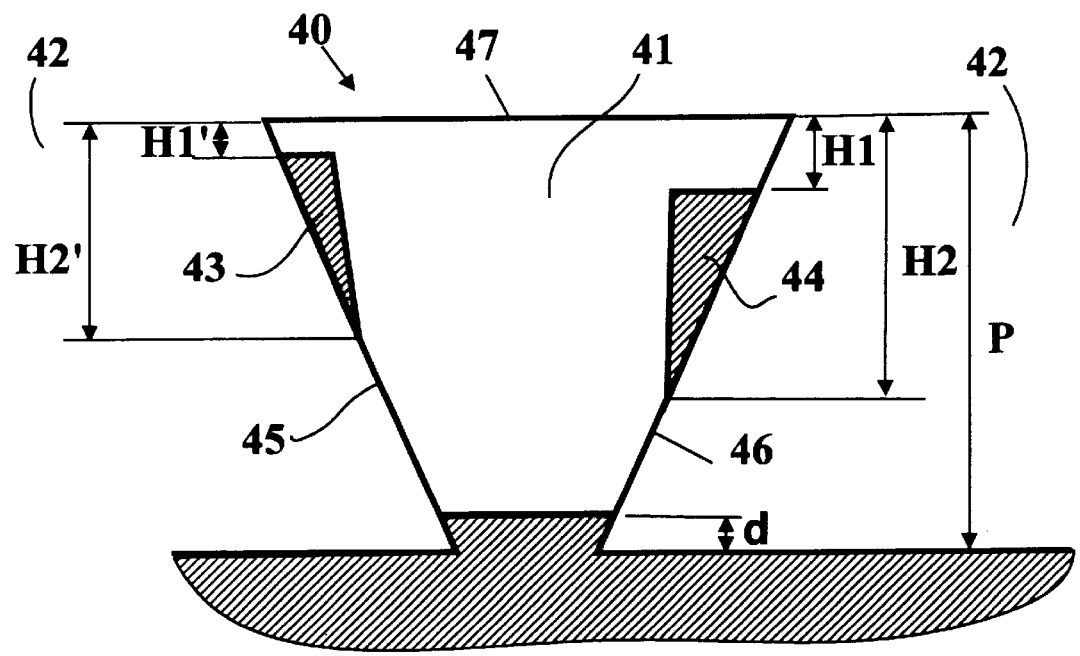
FIG. 4 shows another variant of an incision according to the invention.

This device makes it possible to mold within a rubber tread an element in relief 40 provided with an incision 41 opening on to the wall surface 47 of this element 40 and over the entire width of said element in relief when new, as can be seen in FIG. 4. In this FIG. 4, it can clearly be seen that the incision does not cut into the lateral walls 45 and 46 of the element in relief 40 between depths H1 and H2 on the lateral wall 46 and between depths H1' and H2' on the other lateral wall 45. Furthermore, the incision 41 is not molded as far as the depth of the grooves 42, but stops at a distance d from the bottom of said grooves 42 which may be equal, for example, to the height of the wear indicators.

The principle of production of a mold which has just been described with the two variants of FIGS. 3 and 5 for molding elements in relief of a tread having undercut walls may also be used for molding an element in relief which does not comprise any undercut lateral wall.

Figure 6A:
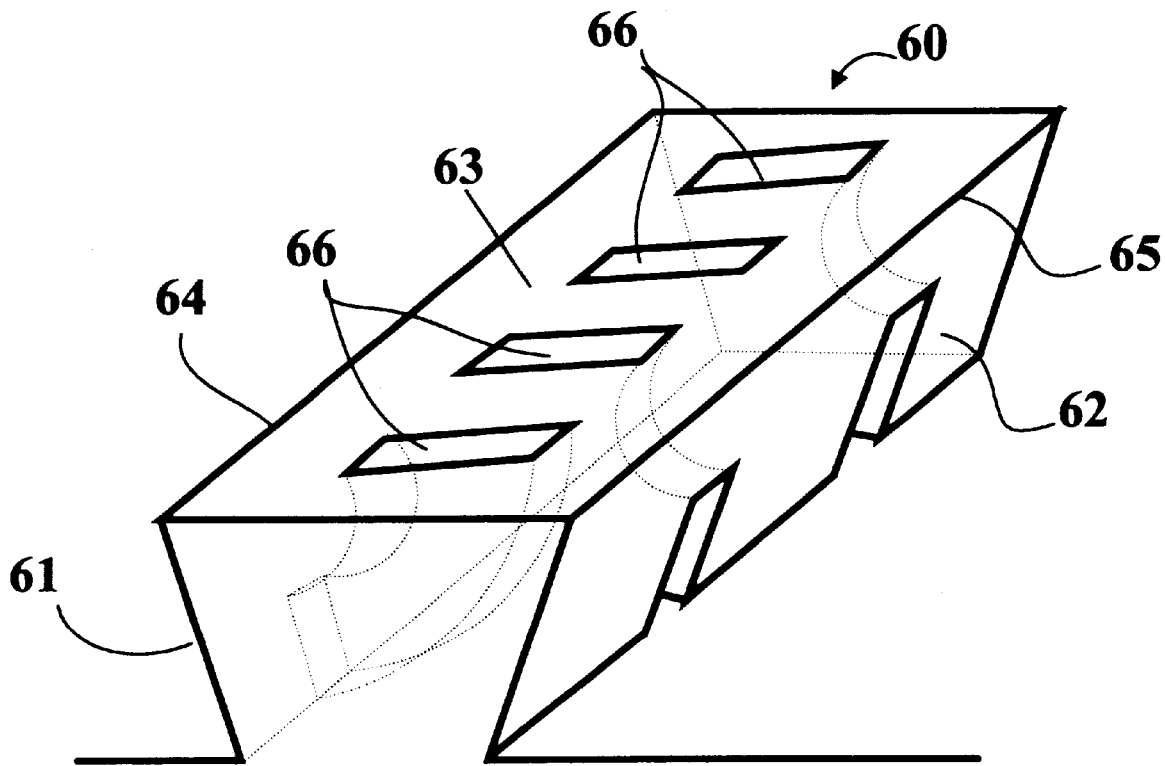
FIGS. 6A and 6B show a variant of a tread pattern according to the invention showing incisions opening alternately on to two lateral walls.
Figure 6B:
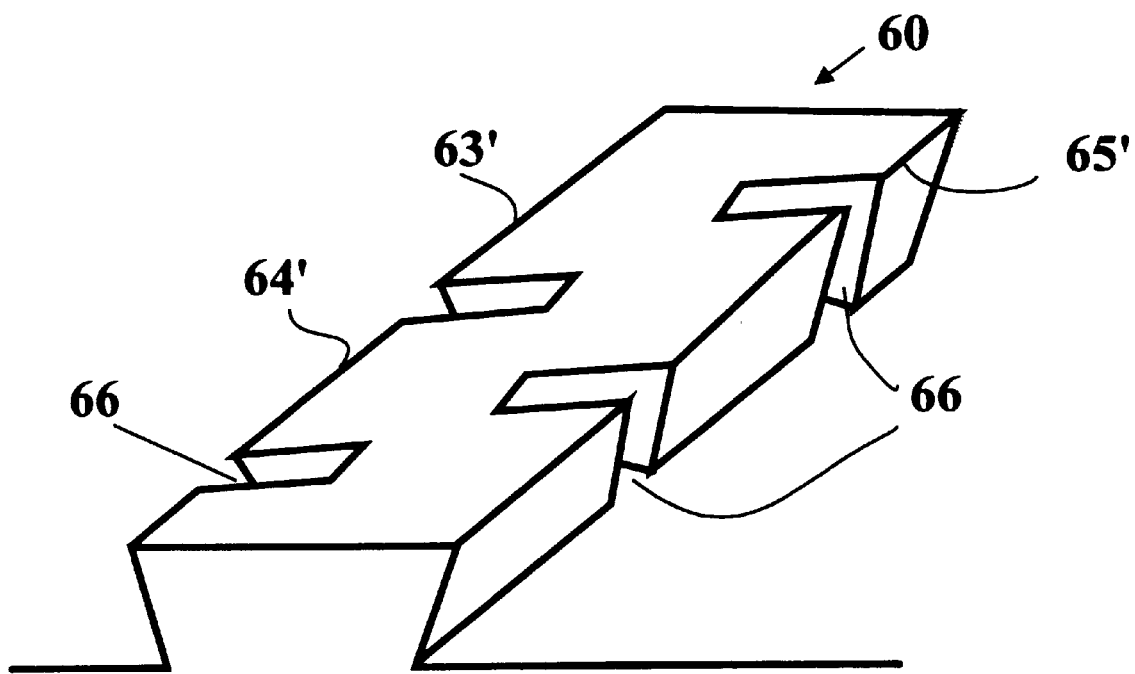

FIGS. 6A and 6B show a variant of the distribution of incisions on an element in relief which makes it possible to maintain a satisfactory level of rigidity for said element whatever the level of wear. In FIG. 6A, there can be seen an element in relief 60 which when new is defined by four lateral walls, two of said lateral walls 61 and 62 being undercut relative to the running surface 63 of said element in relief. The intersection of the undercut lateral walls 61 and 62 with the running surface 63 forms two edges 64 and 65.

This element in relief 60 is provided with four incisions 66 which open on to the running surface 63 of the element when new, none of said incisions cutting into the ridges 64 and 65 when new, and these incisions open alternately on to one lateral wall 61 and then on to the other lateral wall 62.

The same element in relief is shown in FIG. 6B after partial wear of said element corresponding to the moment when the incisions 66 cut into the new ridges 64' and 65' formed by the lateral walls 61 and 62 with the new running surface 63'. It can clearly be seen that the incisions 66 open alternately on to one lateral wall then the other. In this manner, it is possible to retain sufficient rigidity for the element in relief 60 from this level of wear and until the limit of possible wear of said element.

I claim:

1. A tread for a tire which is provided with a tread pattern comprising a plurality of elements in relief defined by grooves, each element in relief being provided with a surface wall intended to come into contact with the ground during travel, and at least two lateral walls undercut relative to the surface wall, the intersection of each of the lateral walls with the surface wall forming a ridge, the tread being characterized in that:

at least one element in relief is provided with at least one incision opening on to the surface wall thereof and on to at least one of its lateral walls;

in that the incision(s) do(es) not cut into the ridge common to said surface wall and to said lateral wall at least between a first depth H1 and a second depth H2, H2 being greater than H1, these depths H1 and H2 being measured perpendicular to the surface wall of the element and corresponding to different levels of wear of the tread; and wherein the depth H2 is at most 50% of the depth P of the groove defining the lateral wall of the element in relief into which the at least one incision opens.

2. A tread for a tire according to claim 1, characterized in that at least one incision opens on to the two lateral walls of the relief element at least between first depths H1, H1' and second depths H2, H2', these depths corresponding to different levels of wear of said tread.

3. A tread for a tire according to claim 2, characterized in that at least on one element in relief the incisions do not cut into the ridges of said element when said tread is new.

4. A tread according to claim 1, characterized in that the elements in relief are ribs oriented virtually in the longitudinal direction of said tread, each rib comprising a plurality of incisions opening on to its surface wall and on to its lateral walls, said incisions not intersecting the ridges of said rib at least between a first depth H1 and a second depth H2 greater than H1, these depths H1 and H2, measured perpendicular to the surface wall of the element, corresponding to different levels of wear of the tread.

5. A tread according to claim 1, characterized in that at least one element in relief comprises, when new, at least two incisions, each of said incisions opening on to the surface wall and on to only one of the lateral walls of said element in relief, and in that said incisions do not cut into the ridges of said element at least between a first depth H1 and a second depth H2, these depths corresponding to different levels of wear of the tread, said incisions opening alternately on to one lateral wall and then on to the other lateral wall.

6. A tread according to claim 1, characterized in that the traces on the surface wall of the incisions which do not cut into the ridges of the elements in relief between H1 and H2 have average orientations with the longitudinal direction of the tread of at least 40°.

7. A tire provided with a tread according to claim 1.

* * * * *